United States Patent
Bartch et al.

(10) Patent No.: US 6,800,994 B2
(45) Date of Patent: Oct. 5, 2004

(54) RESISTIVE PRIMER COATING FOR A DISPLAY APPARATUS

(75) Inventors: Donald Walter Bartch, York, PA (US); Alan Andrew Halecky, Glenmoore, PA (US); John Stephen Farrah, Lancaster, PA (US); James Francis Edwards, Lancaster, PA (US)

(73) Assignee: Thomson Licensing S. A., Boulogne-Billancourt (FR)

( * ) Notice: Subject to any disclaimer, the term of this patent is extended or adjusted under 35 U.S.C. 154(b) by 0 days.

(21) Appl. No.: 10/255,898

(22) Filed: Sep. 26, 2002

(65) Prior Publication Data

US 2004/0061426 A1 Apr. 1, 2004

(51) Int. Cl.[7] .............................................. H01J 29/00
(52) U.S. Cl. .................... 313/479; 313/313; 313/440
(58) Field of Search ................................ 313/479, 313, 313/440; 526/295; 317.1; 252/502, 510, 511; 524/439, 440, 424, 437, 434, 435

(56) References Cited

U.S. PATENT DOCUMENTS 5,300,856 A * 4/1994 Bartch et al. ............... 313/479
6,034,173 A * 3/2000 Rivet ........................... 524/834
6,043,599 A * 3/2000 Nakane ....................... 313/479

* cited by examiner

Primary Examiner—Edward J. Glick
Assistant Examiner—Elizabeth Keaney
(74) Attorney, Agent, or Firm—Joseph S. Tripoli; Harvey D. Fried; Richard LaPeruta, Jr.

(57) ABSTRACT

A display apparatus comprising an evacuated envelope having an interior surface and an exterior surface is disclosed. The envelope includes a faceplate having a luminescent screen on the interior surface thereof. An electron gun is disposed within a neck of the envelope for generating at least one electron beam that is directed toward the luminescent screen. A funnel connects the neck of the envelope with the faceplate. A deflection yoke is disposed around the envelope at the junction of the neck and the funnel. The yoke is attached to the envelope with an adhesive. A resistive primer coating is disposed on the envelope and forms a barrier between the yoke adhesive and the envelope. The resistive primer coating is formed from an aqueous formulation comprising a copolymer of chloroprene and methacrylic acid, a conductive filler material and at least one cross-linking agent.

12 Claims, 2 Drawing Sheets

RESISTIVE PRIMER COATING FOR A DISPLAY APPARATUS

BACKGROUND OF THE INVENTION

1. Field of the Invention

The present invention relates to a display apparatus, such as a cathode-ray tube (CRT) with a deflection yoke attached thereto, and more particularly, to a resistive primer coating that forms a barrier between the tube and the yoke.

2. Description of the Background Art

A display apparatus, such as a television picture tube or a cathode-ray tube (CRT), typically comprises a faceplate panel and a tubular neck connected by a rectangular funnel. A three-color luminescent screen is disposed on an interior surface of the faceplate panel. An electron gun is disposed within the tubular neck and generates at least one, and preferably three electron beams that are directed toward the three-color luminescent screen.

The interior surface of the rectangular funnel is coated with a first conductive coating that extends from the electron gun to the luminescent screen, while a portion of the exterior surface of the funnel is covered with a second conductive coating. The conductive layer on the exterior of the funnel is grounded and, together with the interior conductive layer, forms a capacitor that serves to smooth the voltage to the electron gun. A system of deflection coils, called a deflection yoke, is disposed around the neck-funnel transition region of the tube.

A high resistance coating or layer is typically provided on an exterior portion of the tube underneath the deflection yoke, in order to reduce interference generated by the deflection system. The high resistance layer typically has a resistance between about $10^6$ ohm/square to about $10^{10}$ ohm/square and is electrically connected to the second conductive layer formed on portions of the exterior surface of the tube.

Apparatuses made with an insulating coating, or having no coating at all underneath the yoke, may develop an inductive charge which "flashes over", or electrically discharges, to the deflection yoke or to the second conductive layer formed on portions of the exterior surface of the funnel. This problem is exacerbated in the current generation of high resolution display tubes in which the horizontal scan rate is twice that of prior tubes, thus requiring the deflection yoke to operate at a higher current, thereby increasing the magnitude of the induced charge as well as generating additional heat underneath the yoke.

The high resistance coating underneath the deflection yoke must also be compatible with the manufacturing processes used to make the display tube, such as the alignment and attachment of the deflection yoke. In current tube manufacturing processes, the yoke, after alignment, is secured to the tube with an adhesive. Conventional high resistance coatings comprised of polychloroprene may be incompatible with yoke attachment since their high electrical resistance tends to be diminished when heated to the temperatures used to cure many adhesives. Also, the bond strength of polychloroprene resistive coatings with many hot melt adhesives used to anchor the yoke to the high resistive coating is poor in high humidity.

Thus, a need exists for a high resistance coating which is compatible with the above-described yoke attachment process, and which provides the protection needed to reduce electrical interference from the yoke and to prevent the build-up and flashover of induced charge.

SUMMARY OF THE INVENTION

The present invention relates to a display apparatus comprising an evacuated envelope having an interior surface and an exterior surface. The envelope includes a faceplate having a luminescent screen on the interior surface thereof. An electron gun is disposed within a neck of the envelope for generating at least one electron beam that is directed toward the luminescent screen. A funnel connects the neck of the envelope with the faceplate. A deflection yoke is disposed around the envelope at the junction of the neck and the funnel. The yoke is attached to the envelope with an adhesive.

A resistive primer coating is disposed on the envelope and forms a barrier between the yoke adhesive and the envelope. The resistive primer coating is formed from an aqueous formulation comprising a copolymer of chloroprene and methacrylic acid, a conductive material and at least one cross-linking agent. Cross-linking the acid moieties of this copolymer provides a resistive primer coating with superior pull strength in high humidity and whose electrical resistance is relatively insensitive to cure temperature conditions.

BRIEF DESCRIPTION OF THE DRAWINGS

The invention will now be described in greater detail, with relation to the accompanying drawings, in which.

DETAILED DESCRIPTION OF THE PREFERRED EMBODIMENT

Figure 1:
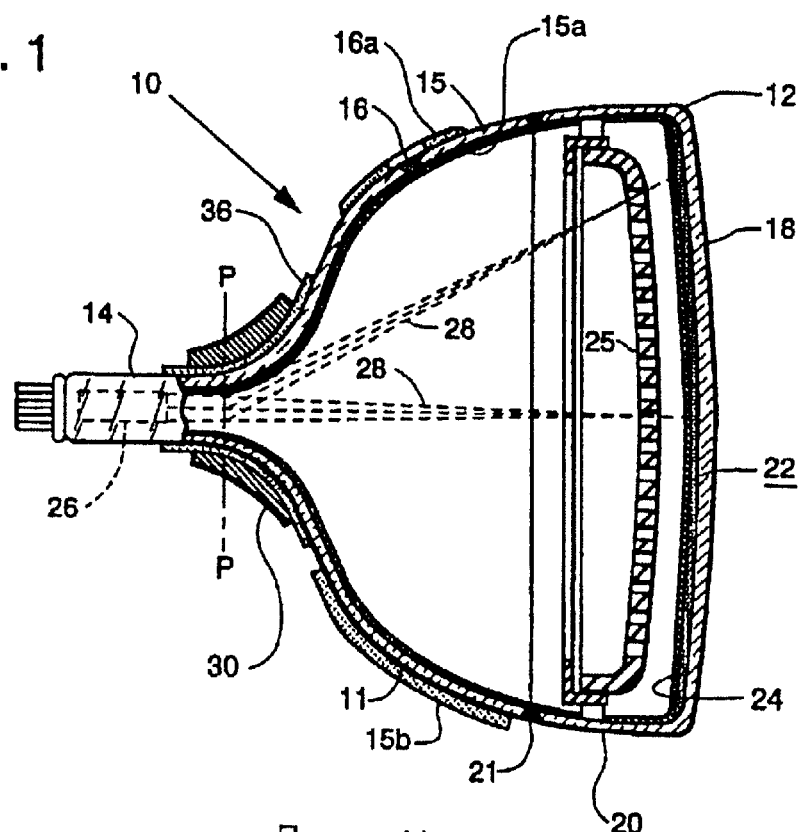
FIG. 1 is a plan view, partially in axial section, of a color display apparatus utilizing the present invention.
Figure 2:
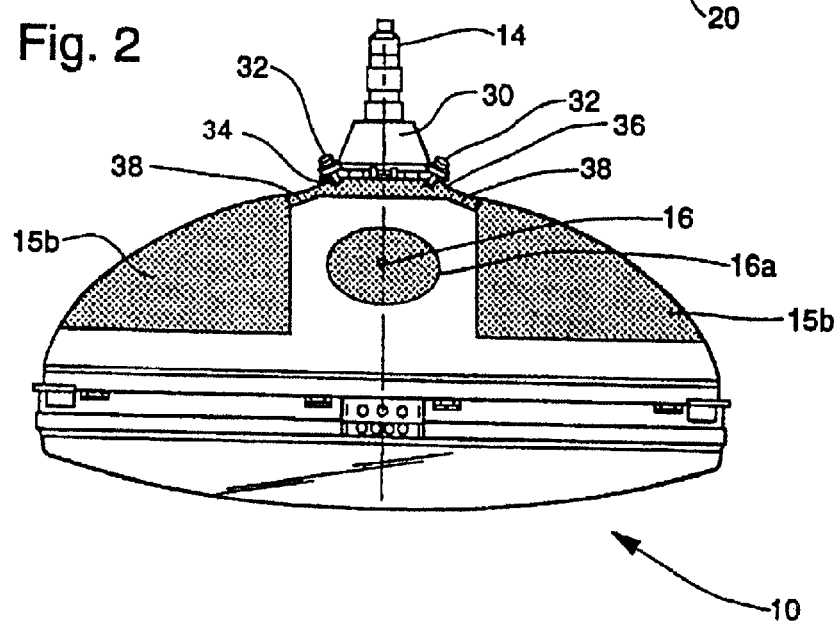
FIG. 2 is a top view of the color display apparatus shown in FIG. 1.

FIGS. 1 and 2 show a conventional color cathode ray tube (CRT) 10 having a glass envelope 11 comprising a faceplate panel 12 and a tubular neck 14 connected by a funnel 15. The funnel 15 has an interior conductive coating 15a that contacts an anode button 16 and extends into the neck. An exterior conductive coating 15b overlies at least a portion of the interior coating 15a. An external insulative coating 16a surrounds the outer portion of the anode button 16.

The faceplate panel 12 comprises a viewing surface 18 and a peripheral flange or sidewall 20 that is sealed to the funnel 15 by a glass frit 21. A three-color luminescent phosphor screen 22 is carried on the inner surface of the faceplate panel 12. The screen 22 preferably is a line screen which includes a multiplicity of screen elements comprised of red-emitting, green-emitting and blue-emitting phosphor stripes R, G and B, respectively, arranged in triads, each triad including a phosphor line of each of the three colors. The R, G and B phosphor stripes extend in a direction that is generally normal to the plane in which the electron beams are generated. A light-absorbing matrix material (not shown) separates each of the R, G and B phosphor stripes.

A thin conductive layer 24, preferably of aluminum, overlies the screen 22 and provides means for applying a uniform first anode potential to the screen 22, as well as for reflecting light, emitted from the R, G and B phosphor stripes, through the viewing surface 18. The screen 22 and the overlying aluminum layer 24 comprise a screen assembly.

A multi-aperture color selection electrode, or shadow mask 25 is removably mounted, by conventional means, within the faceplate panel 12, in a predetermined spaced relation to the screen 22. An electron gun 26, shown schematically by the dashed lines in FIG. 1, is centrally mounted within the neck 14 to generate three inline electron beams 28, a center and two side or outer beams, along convergent paths through the shadow mask 25 to the screen 22. The inline direction of the beams is approximately normal to the plane of the paper.

The CRT 10 is designed to be used with an external magnetic deflection yoke, such as the yoke 30, shown in the neighborhood of the funnel-to-neck junction. When activated, the yoke 30 subjects the three beams 28 to magnetic fields that cause the beams to scan a horizontal and vertical raster across the screen 22. The initial plane of deflection (at zero deflection) is shown by the line P—P in FIG. 1, at about the middle of the yoke 30. For simplicity, the actual curvatures of the deflection beam paths in the deflection zone are not shown. The yoke 30 is attached to the neck 14 by a clamp (not shown) and contacts the envelope in the funnel-to-neck junction by means of a plurality of adjustment screws 32, shown in FIG. 2. The ends of the screws 32 in contact with the envelope are cemented thereto by an adhesive 34.

A novel resistive primer coating 36 having a resistance within a range of about $10^6$ ohms/square to about $10^{10}$ ohms/square, and preferably about $10^7$ ohms/square to about $5\times10^7$ ohms/square, is provided on the exterior surface of the funnel 15, underlying the yoke 30, and extending along the neck 14 of the CRT 10 to be coextensive with the internal coating 15a. As shown in FIG. 2, the resistive primer coating 36 extends forward of the yoke attachment screws 32 and has a pair of oppositely disposed projections 38 which contact the conductive coating 15b.

The resistive primer coating 36 is formed from an aqueous formulation comprising a copolymer of chloroprene and methacrylic acid, a conductive material and at least one cross-linking agent. Cross-linking the acid moieties of this copolymer provides a resistive primer coating with superior pull strength in high humidity and whose electrical resistance is relatively insensitive to cure temperature conditions.

The copolymer of chloroprene and methacrylic acid acts as a barrier between the yoke 30 adhesive and the glass envelope to facilitate accurate attachment of the yoke 30, after yoke 30 alignment. The resistive primer coating 36 is compatible with both urethane and hot-melt adhesives which are used to cement the contacting portions of the yoke attachment screws 32 to the envelope, permitting rapid and accurate yoke attachment so as to speed the manufacturing process.

Figure 3:
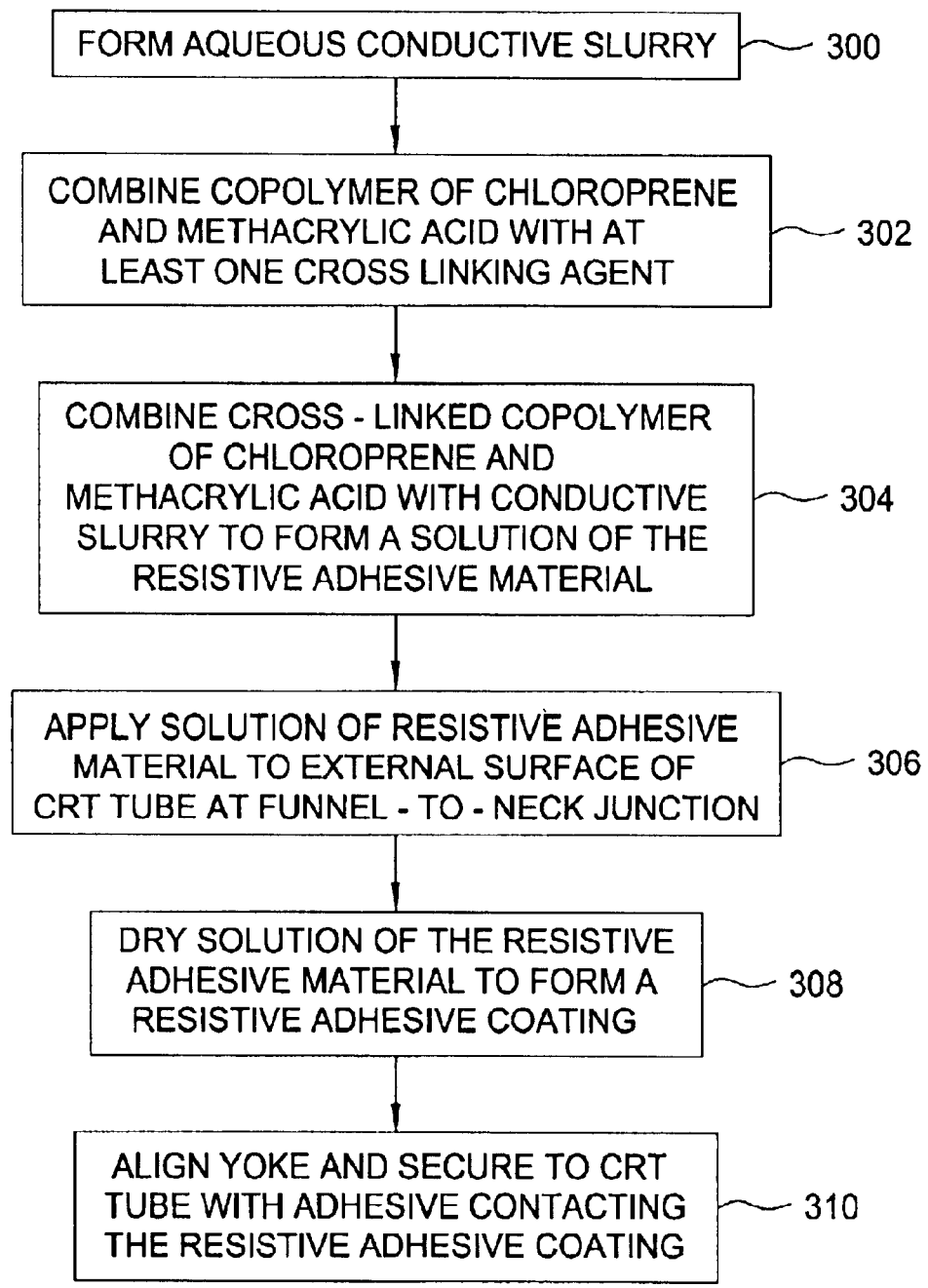
FIG. 3 is a block diagram comprising a flow chart of the manufacturing process for attaching a yoke to the color display apparatus shown in FIG. 2.

The resistive primer coating is manufactured according to the process steps represented schematically in FIG. 3. Initially, an aqueous conductive slurry is formed, as indicated by reference numeral 300. The aqueous conductive slurry may comprise, for example, a conductive material and a dispersant. The conductive slurry preferably includes less than about 25 weight % of the conductive material and less than about 10 weight % of the dispersant.

Examples of suitable conductive materials may include conductive carbon such as, for example, Vulcan XC-72R, commercially available from Cabot Corporation of Boston, Mass. Alternatively, conductive powders including graphite, silver, copper and nickel as well as semiconductive powders including antimony-tin-oxide and indium-tin-oxide (ITO) may be used. Examples of suitable dispersants may include MARASPERSE CBOS-4 and MARASPERSE CBA-1, commercially available from Borregaard Ligno Tech USA of Rothschild, Wis. Alternatively, dispersants including hydrolyzed maleic anhydride copolymers, acrylate copolymers (DISPEX commercially available from Ciba Specialty Chemicals of High Point, N.C.), polycarboxylate salts (TAMOL, commercially available from Rhom and Haas Co. of Philadelphia, Pa.) and condensation products of naphthalene sulfonic acids (DAXAD commercially available from Hampshire Chemical Company of Nashua, N.H.) may be used.

In an exemplary high resistance coating manufacturing process, the aqueous conductive slurry may be formed by stirring 110 grams of MARASPERSE CBOS-4 (commercially available from Borregaard Ligno Tech USA of Rothschild, Wis.) into 2600 grams of deionized water heated to a temperature within a range of about 50° C. to about 60° C. Thereafter, 710 grams of Vulcan XC-72R carbon (commercially available from Cabot Corporation of Boston, Mass.) was stirred into the aqueous solution to form the conductive slurry having about 20 weight % of the conductor.

Referring to reference numeral 302, in a separate container the copolymer of the chloroprene and methacrylic acid is combined with at least one crosslinking agent. The copolymer of chloroprene and methacrylic acid is typically combined with less than about 10 weight % of the at least one crosslinking agent.

The copolymer of chloroprene and methacrylic acid may be NEOPRENE 115, commercially available from Du Pont Corp. of Wilmington, Del. Examples of suitable crosslinking agents may include 1D-229 zinc oxide dispersion, commercially available from R. T. Vanderbilt Co. of Norwalk, Conn. as well as 1E-1233 butyl zimate powder, commercially available from R. T. Vanderbilt Co. of Norwalk, Conn. Alternatively, crosslinking agents including magnesium oxide (MgO), calcium oxide (CaO), lead oxide (PbO), 3,5-diethyl-1,2-dihydro-1-phenyl-2-propylpyridine (VANAX 808, commercially available from R. T. Vanderbilt Co. of Norwalk, Conn.), amyl zimate, N,N'-diethylthiourea, ethylenethiourea, thiocarbanilide and tetramethylthiuram disulfide may also be used.

In an exemplary high resistance coating manufacturing process, the copolymer of chloroprene and methacrylic acid may be combined with the at least one crosslinking agent by, for example, mixing 3300 grams of NEOPRENE 115 (commercially available from DuPont Corp. of Wilmington, Del.), 255 grams of 1D-229 zinc oxide dispersion (commercially available from R. T. Vanderbilt Co. of Norwalk, Conn.), 30 grams of 1E-1233 butyl zimate powder (commercially available from R. T. Vanderbilt Co. of Norwalk, Conn.) with 300 grams of deionized water.

A formulation of the resistive primer material is then formed by combining the formulation comprising the cross-linking agent and the copolymer of chloroprene and methacrylic acid with the conductive slurry, as indicated by reference numeral 304. The formulation of the resistive primer material preferably includes less than about 5 weight % of the conductive material.

In an exemplary process, 510 grams of the conductive slurry is added to the formulation of the cross-linking agent and the copolymer of chloroprene and the methacrylic acid to form a formulation of the resistive primer material comprising about 2.4 to 2.7 weight % of the conductive material. The formulation of the resistive primer material is then mixed using a ball mill for up to about 24 hours. The mixed formulation of the resistive primer material is then filtered through a screen having pores with diameters of about 0.14 cm.

Referring to reference numeral 306, the formulation of the resistive primer material is applied to the exterior surface of the CRT tube 10 at the funnel-to-neck junction. The resistive primer material is applied to the exterior surface of the tube 10 using a brush or other suitable applicator.

Thereafter, resistive primer material applied to the CRT tube 10 is air-dried for at least 15 minutes to form the resistive primer coating 36 thereon, as indicated by reference numeral 308. This air-drying time may be shortened by preheating the CRT tube 10 or drying the resistive primer coating using heated air.

Thereafter, a yoke 30 is attached to the neck 14 by a clamp (not shown) that contacts the envelope in the funnel-to-neck junction by means of a plurality of adjustment screws 32. The ends of the screws 32 in contact with the envelope are cemented to the resistive primer coating by an adhesive 34. The adhesive may be, for example, a urethane or a hot-melt adhesive. Suitable hot-melt adhesives may include MACROMELT #6238, commercially available from Henkel Adhesives Co. of La Grange, Ill.

EXAMPLE 1

The pull strength of hot melt adhesives to the resistive primer coating of the present invention was compared to a conventional resistive coating comprising polychloroprene. A conventional polychloroprene resistive coating was prepared from a formulation combining 3300 grams of Panel Master 40-803A (polychloroprene) (commercially available from National Starch and Chemical Co. of Bridgewater, N.J.), 500 grams of a conductive carbon slurry (110 grams of MARASPERSE CBOS-4 (commercially available from Borregaard Ligno Tech USA of Rothschild, Wis.), 710 grams of Vulcan XC-72R carbon (commercially available from Cabot Corporation of Boston, Mass.) and 2600 grams of deionized water heated to a temperature within a range of about 50° C. to about 60° C.

A resistive primer coating of the present invention was prepared from a formulation combining 3300 grams of NEOPRENE 115 (commercially available from DuPont Corp. of Wilmington, Del.), 255 grams of 1D-229 zinc oxide dispersion (commercially available from R. T. Vanderbilt Co. of Norwalk, Conn.), 30 grams of 1E-1233 butyl zimate powder (commercially available from R. T. Vanderbilt Co. of Norwalk, Conn.) in 300 grams of deionized water with 500 grams of a conductive carbon slurry (110 grams of MARASPERSE CBOS-4 (commercially available from Borregaard Ligno Tech USA of Rothschild, Wis.), 710 grams of Vulcan XC-72R carbon (commercially available from Cabot Corporation of Boston, Mass.) and 2600 grams of deionized water heated to a temperature within a range of about 50° C. to about 60° C.

The pull strength of a polyamide hot melt adhesive applied to the conventional polychloroprene resistive coating at a humidity of 100% was zero pounds. In contrast, the pull strength of the hot-melt adhesive applied to the resistive primer coating comprising the crosslinked copolymer of chloroprene and methacrylic acid at a humidity of 100% was about 13 pounds.

EXAMPLE 2

The electrical resistance of the resistive primer coating of the present invention was compared to a conventional resistive coating comprising polychloroprene as a function of curing temperature. A conventional polychloroprene resistive coating was prepared from a formulation combining 3300 grams of Panel Master 40-803A (polychloroprene) (commercially available from National Starch and Chemical Co. of Bridgewater, N.J.), 500 grams of a conductive carbon slurry (110 grams of MARASPERSE CBOS-4 (commercially available from Borregaard Ligno Tech USA of Rothschild, Wis.), 710 grams of Vulcan XC-72R carbon (commercially available from Cabot Corporation of Boston, Mass.) and 2600 grams of deionized water heated to a temperature within a range of about 50° C. to about 60° C.

A resistive primer coating of the present invention was prepared from a formulation combining 3300 grams of NEOPRENE 115 (commercially available from DuPont Corp. of Wilmington, Del.), 255 grams of 1 D-229 zinc oxide dispersion (commercially available from R. T. Vanderbilt Co. of Norwalk, Conn.), 30 grams of 1E-1233 butyl zimate powder (commercially available from R. T. Vanderbilt Co. of Norwalk, Conn.) in 300 grams of deionized water with 500 grams of a conductive carbon slurry (110 grams of MARASPERSE CBOS-4 (commercially available from Borregaard Ligno Tech USA of Rothschild, Wis.), 710 grams of Vulcan XC-72R carbon (commercially available from Cabot Corporation of Boston, Mass.) and 2600 grams of deionized water heated to a temperature within a range of about 50° C. to about 60° C.

The electrical resistance of the conventional polychloroprene resistive coating was about 12 M$\Omega$ at a curing temperature of 60° C. and fell 75% to 3 M$\Omega$ at a curing temperature of 110° C. In contrast, the electrical resistance of the resistive primer coating comprising the crosslinked copolymer of chloroprene and methacrylic acid was about 12 M$\Omega$ at a curing temperature of 60° C. and fell less than 10% to 10 M$\Omega$ at a curing temperature of 110° C.

What is claim is:

1. A display apparatus comprising a cathode ray tube (CRT), comprising:

an evacuated envelope with an interior surface and an exterior surface, the envelope including a faceplate having a luminescent screen on an interior surface thereof;

a neck with an electron gun therein for generating at least one electron beam;

a funnel connecting the neck and the faceplate;

a deflection yoke disposed on the exterior surface of the envelope at the junction of the neck and the funnel and attached thereto with a yoke adhesive; and a resistive primer coating underlying the yoke and forming a barrier between the yoke adhesive and the envelope, the resistive primer coating comprising a copolymer of chloroprene and methacrylic acid, a conductive material and at least one crosslinking agent.

2. The display apparatus of claim 1 wherein the resistive primer coating is formed from an aqueous formulation comprising at least about 75 weight % of the copolymer of chloroprene and methacrylic acid.

3. The display apparatus of claim 2 wherein the aqueous formulation of the resistive primer coating comprises less than about 5 weight % of the conductive material.

4. The display apparatus of claim 1 wherein the conductive material is a powder selected from the group consisting of carbon, graphite, silver, copper, nickel, antimony-tin-oxide and indium-tin-oxide (ITO).

5. The display apparatus of claim 2 wherein the aqueous formulation of the resistive primer coating comprises less than about 10 weight % of the at least one crosslinking agent.

6. The display apparatus of claim 1 wherein the at least one crosslinking agent is selected from the group consisting of zinc oxide, butyl zimate, magnesium oxide (MgO), calcium oxide (CaO), lead oxide (PbO), 3,5-diethyl-1,2-dihydro-1-phenyl-2-propylpyridine, amyl zimate, N,N'-diethylthiourea, ethylenethiourea, thiocarbanilide and tetramethylthiuram disulfide.

7. A display apparatus comprising a cathode ray tube (CRT), comprising:

an evacuated envelope with an interior surface and an exterior surface, the envelope including a faceplate having a luminescent screen on an interior surface thereof;

a neck with an electron gun therein for generating at least one electron beam;

a funnel connecting the neck and the faceplate;

a deflection yoke disposed on the exterior surface of the envelope at the junction of the neck and the funnel and attached thereto with a yoke adhesive; and a resistive primer coating underlying the yoke and forming a barrier between the yoke adhesive and the envelope, the resistive primer coating formed from an aqueous formulation comprising at least about 75 weight % of a copolymer of chloroprene and methacrylic acid, less than about 5 weight % of a conductive material and less than about 10 weight % of at least one crosslinking agent.

8. The display apparatus of claim 7 wherein the conductive material is a powder selected from the group consisting of carbon, graphite, silver, copper, nickel, antimony-tin-oxide and indium-tin-oxide (ITO).

9. The display apparatus of claim 7 wherein the at least one crosslinking agent is selected from the group consisting of zinc oxide, butyl zimate, magnesium oxide (MgO), calcium oxide (CaO), lead oxide (PbO), 3,5-diethyl-1,2-dihydro-1-phenyl-2-propylpyridine, amyl zimate, N,N'-diethylthiourea, ethylenethiourea, thiocarbanilide and tetramethylthiuram disulfide.

10. A resistive primer coating underlying a yoke and forming a barrier between a yoke adhesive and an envelope of a cathode ray tube (CRT), the resistive primer coating formed from an aqueous formulation, comprising:

at least about 75 weight % of a copolymer of chloroprene and methacrylic acid, less than about 5 weight % of a conductive material and less than about 10 weight % of at least one crosslinking agent.

11. The resistive primer coating of claim 10 wherein the conductive material is a powder selected from the group consisting of carbon, graphite, silver, copper, nickel, antimony-tin-oxide and indium-tin-oxide (ITO).

12. The resistive primer coating of claim 10 wherein the at least one crosslinking agent is selected from the group consisting of zinc oxide, butyl zimate, magnesium oxide (MgO), calcium oxide (CaO), lead oxide (PbO), 3,5-diethyl-1,2-dihydro-1-phenyl-2-propylpyridine, amyl zimate, N,N'-diethylthiourea, ethylenethiourea, thiocarbanilide and tetramethylthiuram disulfide.

* * * * *